US011121593B2

United States Patent
Tsuchida et al.

(10) Patent No.: US 11,121,593 B2
(45) Date of Patent: Sep. 14, 2021

(54) ROTOR, MOTOR, COMPRESSOR, AND REFRIGERATION AIR CONDITIONER

(71) Applicant: Mitsubishi Electric Corporation, Tokyo (JP)

(72) Inventors: Kazuchika Tsuchida, Tokyo (JP); Toshimitsu Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 16/070,542

(22) PCT Filed: Mar. 25, 2016

(86) PCT No.: PCT/JP2016/059740
§ 371 (c)(1),
(2) Date: Jul. 17, 2018

(87) PCT Pub. No.: WO2017/163423
PCT Pub. Date: Sep. 28, 2017

(65) Prior Publication Data
US 2019/0027982 A1    Jan. 24, 2019

(51) Int. Cl.
*H02K 1/27* (2006.01)
*H02K 1/28* (2006.01)
*H02K 21/16* (2006.01)

(52) U.S. Cl.
CPC ............ *H02K 1/276* (2013.01); *H02K 1/27* (2013.01); *H02K 1/28* (2013.01); *H02K 21/16* (2013.01); *H02K 2201/06* (2013.01)

(58) Field of Classification Search
CPC ........ H02K 1/28; H02K 21/16; H02K 1/2766; H02K 1/276

(Continued)

(56) References Cited

U.S. PATENT DOCUMENTS 7,605,510 B2 * 10/2009 Okuma ................. H02K 1/276
                                                310/156.53
7,932,658 B2 *  4/2011 Ionel .................... H02K 1/276
                                                310/156.52

(Continued)

FOREIGN PATENT DOCUMENTS

CN    103780038 A    5/2014
JP    2001-119877 A   4/2001

(Continued)

OTHER PUBLICATIONS

Office Action dated Jun. 19, 2019 issued in corresponding KR patent application No. 10-2018-7022116 (and English translation).

(Continued)

*Primary Examiner* — Terrance L Kenerly
(74) *Attorney, Agent, or Firm* — Posz Law Group, PLC (57) ABSTRACT

A rotor includes a rotor core and a magnet inserted into a magnet insertion hole formed in the rotor core. The magnet insertion hole extends in parallel with the rotation axis of the rotor core and, when viewed along the rotation axis, has an arcuate shape having a central portion projecting toward the rotation axis. The arcuate shape of the magnet insertion hole is formed such that the arcuate shape includes a first arcuate surface and a second arcuate surface that has a center identical to a center of the first arcuate surface and that has a radius larger than the radius of the first arcuate surface. The second arcuate surface includes two projections projecting toward the first arcuate surface. The magnet is inserted between the two projections and makes contact with the two projections.

4 Claims, 7 Drawing Sheets

(58) Field of Classification Search
USPC .................. 310/156.53, 156.56, 156.57
See application file for complete search history.

(56) References Cited

U.S. PATENT DOCUMENTS

| | | | |
|---|---|---|---|
| 8,405,270 B2* | 3/2013 | Li | H02K 1/276 310/156.53 |
| 2010/0148612 A1* | 6/2010 | Takemoto | H02K 29/03 310/156.53 |
| 2015/0303749 A1* | 10/2015 | Okubo | H02K 1/2766 310/156.38 |

FOREIGN PATENT DOCUMENTS

| | | |
|---|---|---|
| JP | 2002-136011 A | 5/2002 |
| JP | 2003-088071 A | 3/2003 |
| JP | 2014-007928 A | 1/2014 |
| JP | 2014-100048 A | 5/2014 |
| JP | 2014-193065 A | 10/2014 |
| WO | 2016/006103 A1 | 1/2016 |

OTHER PUBLICATIONS

International Search Report of the International Searching Authority dated Jun. 7, 2016 for the corresponding international application No. PCT/JP2016/059740 (and English translation).
Office Action dated Nov. 6, 2019 issued in corresponding CN patent application No. 201680082337.9 (and English translation).

\* cited by examiner

ROTOR, MOTOR, COMPRESSOR, AND REFRIGERATION AIR CONDITIONER

CROSS REFERENCE TO RELATED APPLICATION

This application is a U.S. national stage application of PCT/JP2016/059740 filed on Mar. 25, 2016, the contents of which are incorporated herein by reference.

FIELD

The present invention relates to a rotor, a motor, a compressor, and a refrigeration air conditioner.

BACKGROUND

Examples of motors include an embedded-magnet motor that has a rotor in which a plate-like magnet is inserted in a magnet insertion hole formed in a rotor core. In Patent Literature 1, a magnet insertion hole and a magnet inserted in the magnet insertion hole have curved shapes that come closer to the outer surface of a rotor toward the ends.

In an embedded magnet motor, the magnets become demagnetized due to the diamagnetic field emanating from the stator, which decreases the magnetic force of the rotor, reduces the efficiency, and may also lower the controllability owing to a change in the motor characteristics. Thus, in order to suppress demagnetization of magnets due to the diamagnetic field from a stator, spaces are sometimes formed between the magnets and magnet insertion holes at the ends of the magnets.

CITATION LIST

Patent Literature

Patent Literature 1: Japanese Patent Application Laid-open. No. 2002-136011

SUMMARY

Technical Problem

Forming such spaces at the ends of the magnets, however, may allow movement of the magnets in the magnet insertion holes. When the magnets move in the magnet insertion holes, the rotor core and the magnets may be brought into contact with each other, which may damage the magnets. In addition, when the magnets move in the magnet insertion holes, the spaces at the ends of the magnet may become insufficient and the efficiency of the motor may deteriorate due to the demagnetization caused by the diamagnetic field emanating from the stator.

The present invention has been made in view of the above, and an object thereof is to provide a rotor enabling improvement in reliability and efficiency by suppressing movement of the magnets inside the magnet insertion holes.

Solution to Problem

To solve the aforementioned problems and to achieve the object, a rotor according to the present invention includes a rotor core and a magnet inserted into a magnet insertion hole formed in the rotor core. The magnet insertion hole extends in parallel with the rotation axis of the rotor core, and it has an arcuate shape with a central portion projecting toward the rotation axis when viewed in cross section perpendicular to the rotation axis. The magnet insertion hole is formed such that the arcuate shape includes a first arcuate surface and a second arcuate surface. The second arcuate surface has a center identical to the center of the first arcuate surface and has a radius larger than the radius of the first arcuate surface. The second arcuate surface includes two projections projecting toward the first arcuate surface. The magnet is inserted between the two projections and is in contact with the two projections.

Advantageous Effects of Invention

A rotor according to the present invention produces an effect of enabling improvement in reliability and efficiency by suppressing movement of magnets inside magnet insertion holes.

DESCRIPTION OF EMBODIMENTS

A rotor, a motor, a compressor, and a refrigeration air conditioner according to certain embodiments of the present invention will be described in detail below with reference to the drawings. Note that the present invention is not limited to the embodiments.

First Embodiment

Figure 1:
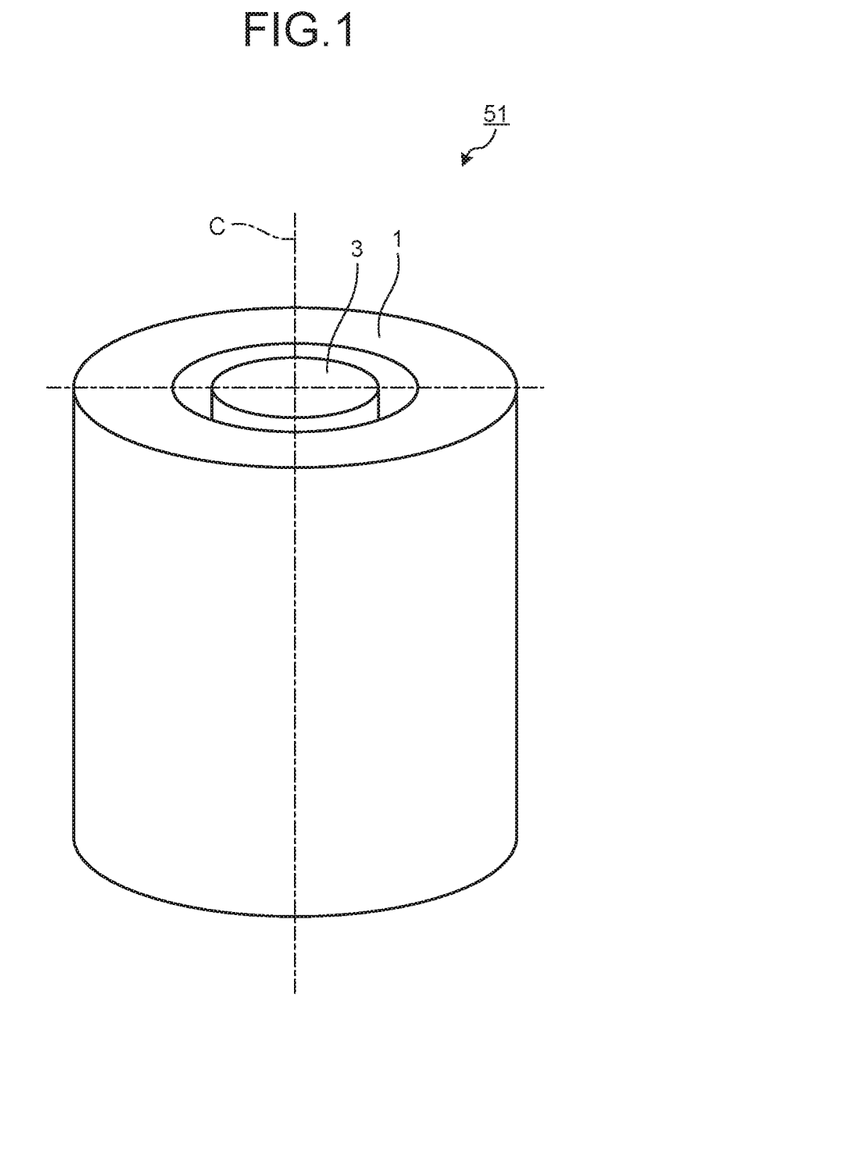
FIG. 1 is a perspective view illustrating a schematic configuration of a motor according to a first embodiment of the present invention.

FIG. 1 is a perspective view illustrating a schematic configuration of a motor according to a first embodiment of the present invention. A motor 51 includes a stator 1 having a cylindrical shape and a rotor 3 located inside the stator 1 and having a columnar shape or a cylindrical shape. The stator 1 and the rotor 3 are positioned about a common rotation axis C, and the rotor 3 rotates about the rotation axis C.

Figure 2:
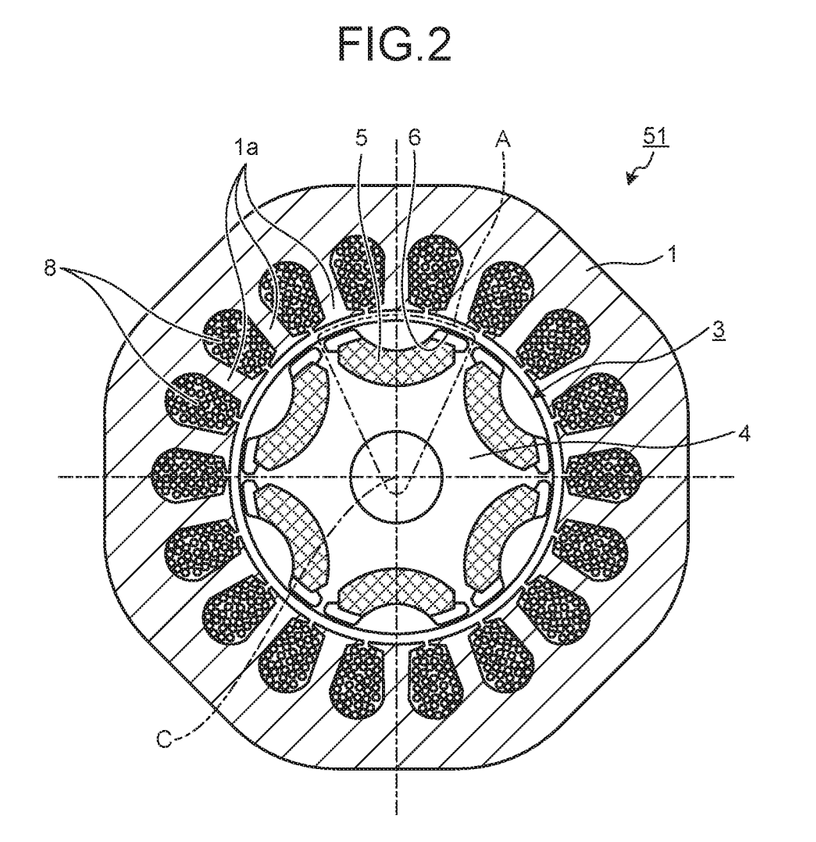
FIG. 2 illustrates the motor according to the first embodiment when viewed in cross section perpendicular to the rotation axis.

FIG. 2 illustrates the motor 51 according to the first embodiment when viewed in cross section perpendicular to the rotation axis C. The stator 1 has a plurality of teeth 1a, which project inward and around which a wire 8 is wound. The rotor 3 is disposed with a space between the rotor 3 and the stator 1.

The rotor 3 includes a rotor core 4 and magnets 5. The rotor core 4 is made of a plurality of electromagnetic steel sheets laminated together in the direction along the rotation axis C. The rotor core 4 has a cylindrical shape or a columnar shape, and it constitutes the outline of the rotor 3. Magnet insertion holes 6 extending in the direction along the rotation axis C are formed in the rotor core 4. The magnets 5, which are permanent magnets, are inserted and fitted in the magnet insertion holes 6. The magnets 5 are rare-earth magnets composed mainly of neodymium and dysprosium. Because rare-earth magnets provides high residual magnetic flux density and high coercivity, use of rare-earth magnets enables a permanent magnet-embedded motor with high efficiency and excellent resistance to demagnetization to be produced.

The number of magnet insertion holes 6 formed in the rotor core 4 is the same as the number of poles of the motor 51, and six magnet insertion holes 6 are formed in the first embodiment. The magnet insertion holes 6 are formed to extend in parallel with the rotation axis C through the rotor core 4.

Figure 3:
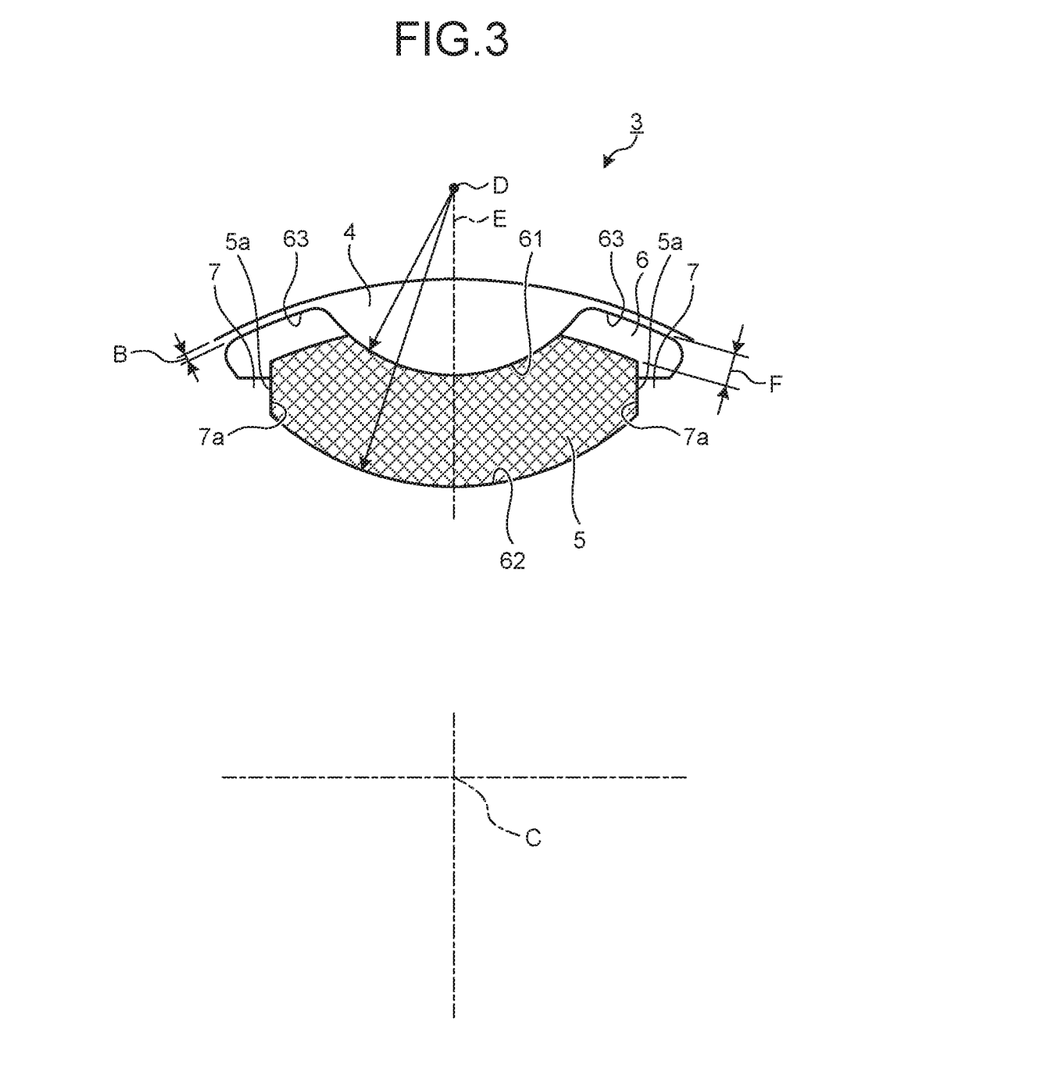
FIG. 3 is a partially enlarged view of a part A illustrated in FIG. 2.

FIG. 3 is a partially enlarged view of a part A illustrated in FIG. 2. The magnet insertion holes 6 each have an arcuate shape with a central portion projecting toward the rotation axis C when viewed in a cross section perpendicular to the rotation axis C. The arcuate shape has a first arcuate surface 61 and a second arcuate surface 62, with both having a common center C. The second arcuate surface 62 has a radius larger than the radius of the first arcuate surface 61.

In addition, the ends of the first arcuate surface 61 and the ends of the second arcuate surface 62 are connected by connection surfaces 63 parallel to the outer surface of the rotor core 4. The distances between the outer surface of the rotor core 4 and the connection surfaces 63, i.e., outer circumferential bridge widths B, which are the distances between the outer surface of the rotor core 4 and the magnet insertion holes 6, are equal at each end of the magnet insertion hole 6. In a case where the electromagnetic steel sheets constituting the rotor core 4 are produced by pressing, the outer circumferential bridge widths B needs to be equal to or larger than the thickness of the electromagnetic steel sheets constituting the rotor core 4. When viewed in cross section perpendicular to the rotation axis C, the magnet insertion hole 6 has a symmetrical shape with respect to a virtual line E, which is a line connecting the midpoint of the first arcuate surface 61 with the midpoint of the second arcuate surface 62 of the magnet insertion hole 6.

The second arcuate surface 62 includes two projections 7 projecting toward the first arcuate surface 61. Each of the two projections 7 has a projection contact surface 7a that makes contact with the magnet 5. The projection contact surfaces 7a are flat faces. The projection contact surfaces 7a formed on the two projections 7 are parallel to each other. In addition, the projection contact surfaces 7a are formed to be symmetrical to each other about the virtual line E.

The magnet 5 inserted in the magnet insertion hole 6 has an arcuate shape when viewed in cross section perpendicular to the rotation axis C. The arcuate shape is similar to that of the magnet insertion hole 6. The magnet 5 inserted in the magnet insertion hole 6 is in contact with the first arcuate surface 61 and the second arcuate surface 62. The magnet 5 is inserted between the two projections 7.

The magnet 5 has, at each of its ends, magnet contact surfaces 5a that make contact with the projection contact surface 7a. The magnet contact surfaces 5a are flat faces. Thus, the contacts between the projection contact surface 7a and the magnet contact surfaces 5a are contacts between flat faces. In a state when the magnet 5 is inserted in the magnet insertion hole 6, the magnet 5 has a symmetrical shape with respect to the virtual line E, and the magnet contact surfaces 5a are also symmetrical to each other with respect to the virtual line E. The magnetic pole center line of the rotor 3 is thus identical to the virtual line E. Note that the magnetic pole center line refers to a line extending from the rotation axis C through the center of the poles of the magnet 5.

In addition, in the state when the magnet 5 is inserted in the magnet insertion hole 6, spaces are formed between the connection surfaces 63 of the magnet insertion hole 6 and the magnet 5. The distances between the connection surfaces 63 and the magnet 5, i.e., the widths F of the spaces, are equal at each end of the magnet 5.

In the motor described above, the magnet contact surfaces 5a formed on the magnets 5 have a contact with the projection contact surface 7a formed on the rotor core 4, which suppresses movement of the magnets 5 in the magnet insertion holes 6 while the rotor 3 rotates. This reduces damage to the magnets 5 and improves the reliability of the motor 51. Furthermore, this reduces deterioration in the efficiency of the motor 51 caused by narrowing of the widths F of the spaces.

In addition, it is easy to accurately measure the distance from one surface as a reference surface to another surface when the surfaces are flat surfaces parallel to each other as is the case with the magnet contact surfaces 5a in the first embodiment. In contrast, it is difficult to accurately measure the distance between surfaces that are not flat surfaces or that are not parallel to each other. Thus, with the rotor 3 in which the magnet contact surfaces 5a formed on each magnet 5 are flat surfaces parallel to each other, the accuracy of the distances between the magnet contact surfaces 5a is easily improved in the production process of the magnets 5. This allows more reliable suppression of rattling of the magnets 5 in the magnet insertion holes 6.

In addition, because the contacts between the projection contact surfaces 7a and the magnet contact surfaces 5a are contacts between flat faces, accurate contacts are more easily achieved than in a case of contacts between curved surfaces; and a decrease in contact areas due to point contacts or line contacts between the projection contact surface 7a and the magnet contact surfaces 5a is more easily prevented. It is thus possible to achieve sufficient area of contact between the projection contact surface 7a and the magnet contact surfaces 5a and to reliably suppress rattling of the magnets 5 in the magnet insertion holes 6.

In the case where the projections 7 are formed on the first arcuate surface 61, a force acting on the projections 7 from the magnets 5 during rotation of the rotor 3 will concentrate on the portions between the outer surface of the rotor core 4 and the connection surfaces 63. The widths of the portions between the outer surface of the rotor core 4 and the connection surfaces 63, i.e., the outer circumferential bridge widths B are, however, to be as small as possible in order to improve the efficiency of the motor 51. In the case where the projections 7 are formed on the first arcuate surface 61, the portions between the outer surface of the rotor core 4 and the connection surfaces 63 may therefore be damaged by the force acting on the projections 7. In the motor 51 of the first embodiment, however, because the projections 7 are formed on the second arcuate surface 62, the portions between the outer surface of the rotor core 4 and the connection surfaces 63 are less likely to be damaged.

Note that the shape of the projections 7 is not limited to that illustrated in FIGS. 2 and 3, and the shape can be a quadrangle or another shape when viewed in cross section perpendicular to the rotation axis C.

Figure 4:
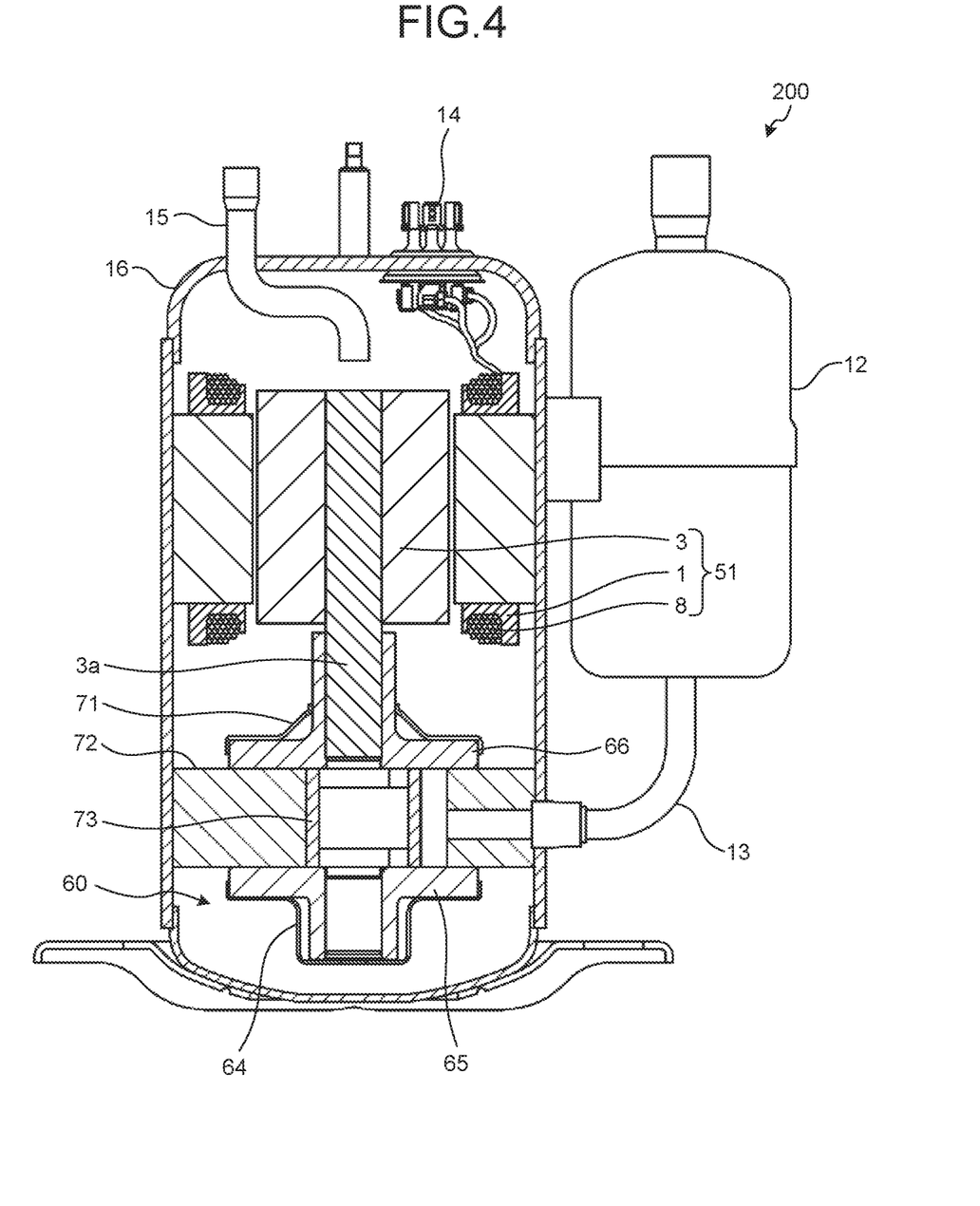
FIG. 4 is a cross-sectional view of a compressor including the motor according to the first embodiment.

Next, a compressor including the motor 51 will be described. FIG. 4 is a cross-sectional view of a compressor including the motor 51 according to the first embodiment.

The compressor 200 has an airtight container 16 made of a steel sheet formed into a cylindrical shape by drawing. The motor 51 and a compressing part 60 are disposed in the airtight container 16, and refrigerating machine oil for lubricating a sliding portion of the compressing part 60 is accumulated at the bottom of the airtight container 16. A mechanism such as a scroll, rotary, or reciprocating mechanism is used in the compressing part 60.

The stator 1 is held on an inner circumference of the airtight container 16 by shrink fitting, freeze fitting, or press fitting. Electric power is supplied to the wire 8 wound around the stator 1 through a glass terminal 14 fixed to the airtight container 16.

A shaft 3a extending from the rotor 3 is held, such that the rotor is rotatable, by an upper frame 66 and a lower frame 65 which serve as bearings.

The compressing part 60 includes a cylinder 72 disposed in a vertically layered state; a piston 73 through which the shaft 3a extends; the upper frame 66 and the lower frame 65, which constitute a vertical pair and close the end faces of the cylinder 72 in the axial direction of the cylinder 72 and through which the shaft 3a extends; an upper discharge muffler 71 mounted on the upper frame 66; a lower discharge muffler 64 mounted on the lower frame 65; and a vane (not illustrated) that partitions the inside of the cylinder 72 into a suction side and a compression side.

Operation of the compressor 200 will be explained here. A refrigerant gas supplied from an accumulator 12 is taken into the cylinder 72 through an inlet pipe 13 fixed to the airtight container 16. When power is supplied to an inverter, the rotor 3 rotates, which rotates the piston 73 fitted to the shaft 3a in the cylinder 72, and the refrigerant is compressed in the cylinder 72. The compressed high-temperature refrigerant passes through the upper discharge muffler 71 and the lower discharge muffler 64; then flows upward in the airtight container 16 through a space between the stator 1 and the rotor 3 or through an air hole (not illustrated) formed in the rotor 3; and is supplied to a high-pressure side of a refrigeration cycle through a discharge pipe 15 provided on the airtight container 16.

Figure 5:
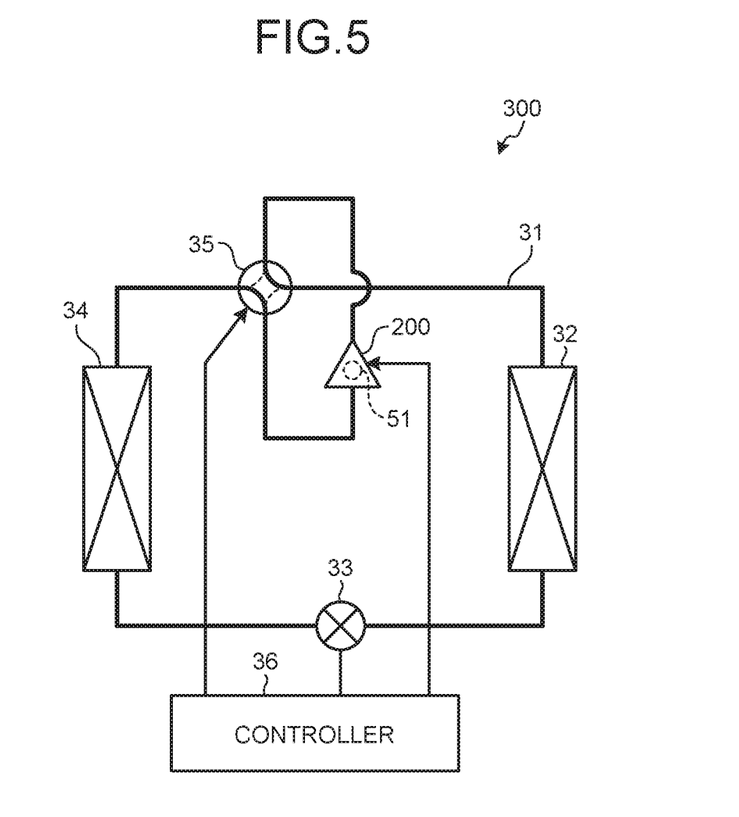
FIG. 5 is a configuration diagram of a refrigeration air conditioner including the compressor of the first embodiment.

Next, a refrigeration air conditioner including the motor 51 will be described. FIG. 5 is a configuration diagram of a refrigeration air conditioner including the compressor 200 of the first embodiment. The refrigeration air conditioner 300 includes the compressor 200 including the motor 51; a four-way valve 35; a condenser 32 that exchanges heat between a refrigerant gas and air to condense the refrigerant into a liquid refrigerant, the refrigerant gas being at a high-temperature and high-pressure as a result of being compressed by the compressor 200; an expander 33 that expands the liquid refrigerant to a low-temperature and low-pressure liquid refrigerant; an evaporator 34 that makes the low-temperature and low-pressure liquid refrigerant absorb heat to turn the refrigerant into a low-temperature and low-pressure gas refrigerant; and a controller 36 that controls the compressor 200, the expander 33, and the four-way valve 35. The compressor 200, the four-way valve 35, the condenser 32, the expander 33, and the evaporator 34 are connected with one another by refrigerant pipes 31 and constitute the refrigeration cycle. By incorporating the compressor 200, the refrigeration air conditioner 300 can be provided as a high-efficiency, high-power refrigeration air conditioner.

Second Embodiment

Figure 6:
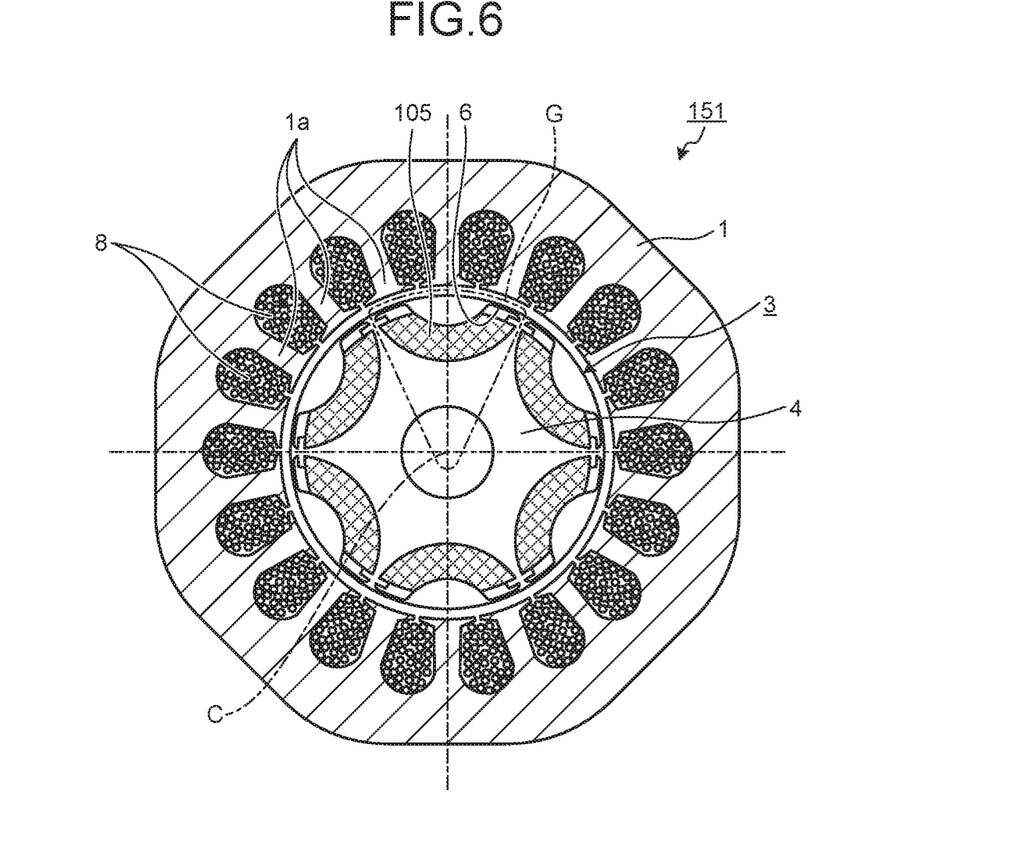
FIG. 6 illustrates a motor according to a second embodiment when viewed in cross section perpendicular to a rotation axis.
Figure 7:
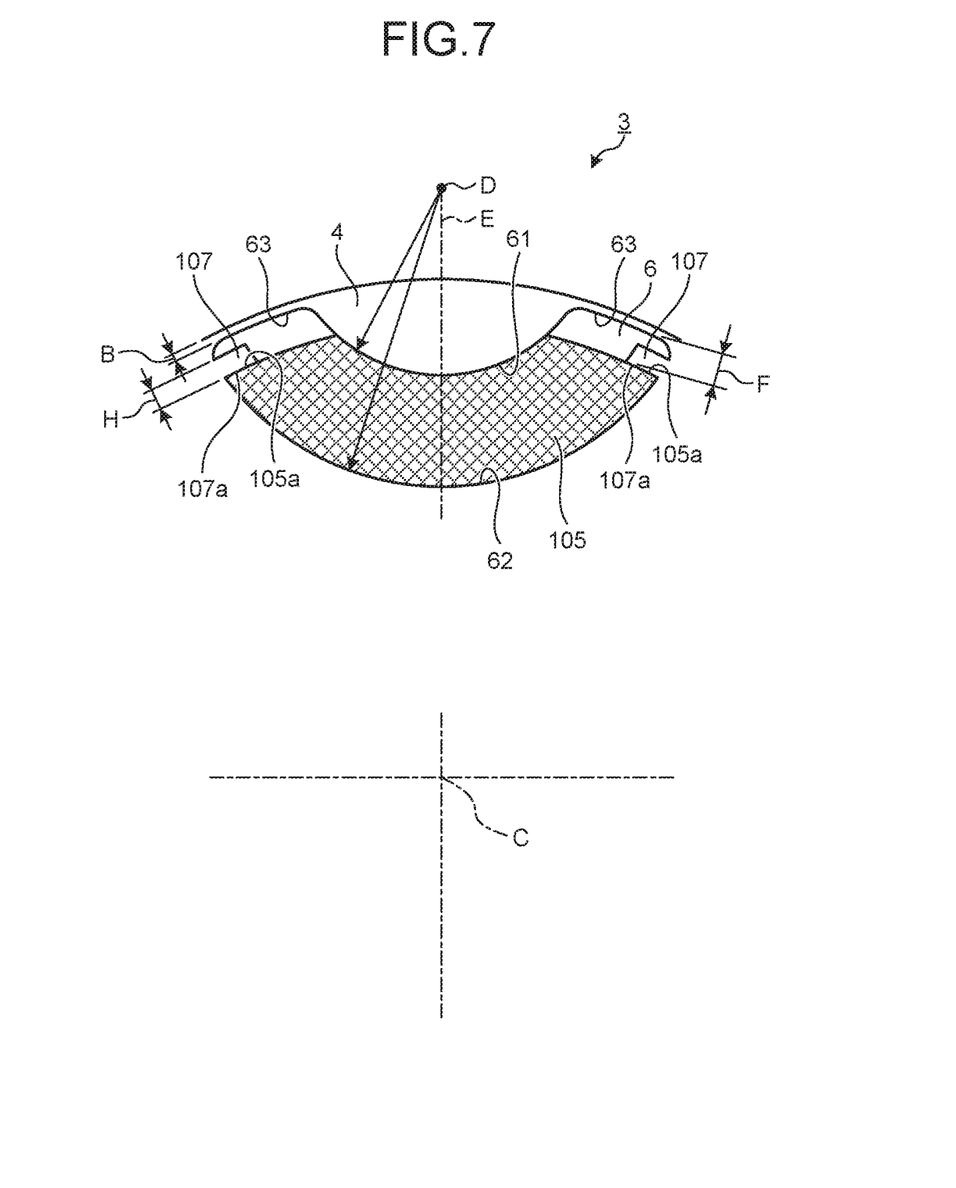
FIG. 7 is a partially enlarged view of a part G illustrated in FIG. 6.

FIG. 6 illustrates a motor 151 according to a second embodiment viewed in cross section perpendicular to the rotation axis. FIG. 7 is a partially enlarged view of a part G illustrated in FIG. 6. Note that components similar to the components in the first embodiment will be represented by the same reference numerals, and detailed description thereof will not be repeated.

In the motor 151 according to the second embodiment, the shape of projections 107 formed on the second arcuate surface 62 of the magnet insertion hole 6, i.e., the shape of projection contact surfaces 107a in particular is different from that in the first embodiment. Specifically, the distance between the projection contact surfaces 107a becomes smaller with increasing distance from the second arcuate surface 62. In other words, it can be said that the projection contact surfaces 107a are formed to extend toward the virtual line E or it can be said that the projection contact surfaces 107a are formed to extend toward the magnetic pole center line.

Magnet contact surfaces 105a that make contact with the projection contact surfaces 107a are formed on a magnet 105 to be inserted in the magnet insertion hole 6. In a state when the magnet 105 is inserted in the magnet insertion hole 6, the distance between the magnet contact surfaces 105a becomes smaller with increasing distance from the second arcuate surface 62.

In the motor 151 according to the second embodiment, the projection contact surfaces 107a and the magnet contact surfaces 105a are in contact with each other, which suppresses movement of the magnets 105 in the magnet insertion holes 6 similarly to the first embodiment.

In addition, as illustrated in FIG. 7, the projection contact surfaces 107a have a contact with the magnets 105 on the outer circumference side of the rotor core 4, which allows the projection contact surfaces 107a to receive the centrifugal force generated on the magnets 105 while the rotor 3 rotates. Thus, movement of the magnets 105 in the magnet insertion holes 6 during rotation of the rotor 3 is more reliably suppressed.

Note that, because the centrifugal force generated on the magnets 105 during rotation of the rotor 3 is received by the projection contact surfaces 107a, the projections 107 are required to have a certain strength. Thus, the widths H of base portions of the projections 107, i.e., the widths H at boundaries between the projections 107 and the second arcuate surface 62 are preferably larger than the outer circumferential bridge widths B so that the projections 107 have sufficient strength.

The shape of the projections 107 is not limited to that illustrated in FIGS. 6 and 7, and the shape can be a triangle or another shape when viewed in cross section perpendicular to the rotation axis C. In addition, the projection contact surfaces 107a and the magnet contact surfaces 105a can be both flat surfaces or can be both curved surfaces. Note that, when the projection contact surface 107a and the magnet contact surfaces 105a are flat surfaces, a decrease in the contact areas due to point contacts or line contacts between the projection contact surface 107a and the magnet contact surfaces 105a is more easily prevented.

Furthermore, the motor 151 according to the second embodiment can be used in the compressor and the refrigeration air conditioner illustrated in FIGS. 4 and 5.

The configurations presented in the embodiments above are examples of the present invention, and they can be combined with other known technologies or can be partly omitted or modified without departing from the scope of the invention.

REFERENCE SIGNS LIST 1 stator; 1a tooth; 3 rotor; 3a shaft; 4 rotor core; 5, 105 magnet; 5a, 105a magnet contact surface; 6 magnet insertion hole; 7, 107 projection; 7a, 107a projection contact surface; 8 wire; 51, 151 motor; 61 first arcuate surface; 62 second arcuate surface; 63 connection surface.

The invention claimed is:

1. A rotor comprising:
a rotor core; and
a magnet inserted into a magnet insertion hole formed in the rotor core, wherein
the magnet insertion hole extends in parallel with a rotation axis of the rotor core and, when viewed in cross section perpendicular to the rotation axis, has an arcuate shape having a central portion projecting toward the rotation axis,
the arcuate shape of the magnet insertion hole is formed such that the arcuate shape includes a first arcuate surface and a second arcuate surface, the second arcuate surface having a center identical to a center of the first arcuate surface and having a radius larger than a radius of the first arcuate surface,
the second arcuate surface includes two projections projecting toward the first arcuate surface,
the projections each have a projection contact surface that makes contact with the magnet, the projection contact surfaces being flat faces parallel to each other,
the magnet is inserted between the two projections, and
the magnet has two distal angled ends angled between the first arcuate surface and the second arcuate surface, the angled ends including magnet contact surfaces that make contact with the projection contact surfaces, the magnet contact surfaces being flat faces parallel to each other, the angled ends projecting beyond the projection contact surfaces into the magnet insertion hole in a space formed between distal ends of the magnet and the rotor core.

2. A motor comprising:
a stator having a cylindrical shape; and
the rotor according to claim 1 rotatably provided inside the stator.

3. A compressor comprising the motor according to claim 2.

4. A refrigeration air conditioner comprising the compressor according to claim 3.

* * * * *